(12) United States Patent
Geronimi (10) Patent No.: US 7,701,517 B1
(45) Date of Patent: *Apr. 20, 2010

(54) ELECTRONIC IMAGE DISPLAY SYSTEMS

(75) Inventor: Heather A. Geronimi, Phoenix, AZ (US)

(73) Assignee: Dual Image Systems, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/060,180

(22) Filed: Mar. 31, 2008

Related U.S. Application Data (63) Continuation of application No. 11/084,665, filed on Mar. 18, 2005, now Pat. No. 7,352,415.

(60) Provisional application No. 60/565,143, filed on Apr. 23, 2004.

(51) Int. Cl.
*H04N 5/64* (2006.01)
*G09G 5/00* (2006.01)

(52) U.S. Cl. .................... 348/739; 348/840; 345/1.1

(58) Field of Classification Search ............... 348/739, 348/383, 789, 794–797, 836, 839, 840, 725, 348/706; 345/1.1, 1.3; 248/917; 361/681; 40/572, 606.18, 901
See application file for complete search history.

(56) References Cited

U.S. PATENT DOCUMENTS

| | | | |
|---|---|---|---|
| 4,734,779 A | 3/1988 | Levis et al. | |
| 5,023,725 A | 6/1991 | McCutchen | |
| 5,130,794 A | 7/1992 | Ritchey | |
| 5,612,741 A | 3/1997 | Loban et al. | |
| 5,758,258 A * | 5/1998 | Shoff et al. | 725/116 |
| 5,828,410 A | 10/1998 | Drapeau | |
| 6,025,869 A | 2/2000 | Stas et al. | |
| 6,150,996 A | 11/2000 | Nicholson et al. | |
| 6,236,330 B1 | 5/2001 | Cohen | |
| 6,309,072 B1 | 10/2001 | Deter | |
| 6,343,006 B1 | 1/2002 | Moscovitch et al. | |
| 6,568,816 B2 | 5/2003 | Mayer, III et al. | |
| 6,569,018 B2 | 5/2003 | Jaffe | |
| 6,662,365 B1 | 12/2003 | Sullivan et al. | |
| 6,690,337 B1 | 2/2004 | Mayer, III et al. | |
| 6,801,185 B2 | 10/2004 | Salley | |
| 6,844,865 B2 | 1/2005 | Stasko | |
| 7,118,228 B2 | 10/2006 | May | |
| 2001/0005454 A1 | 6/2001 | Nishino et al. | |
| 2004/0196362 A1 | 10/2004 | Hoshino et al. | |
| 2005/0061937 A1 | 3/2005 | Kim | |

* cited by examiner

*Primary Examiner*—Victor Kostak
(74) *Attorney, Agent, or Firm*—Stoneman Volk Patent Group; Martin L. Stoneman; Michael D. Volk, Jr.

(57) ABSTRACT

Dual display screens are oriented back-to-back such that one display screen is visible from a first direction and one display screen is visible from a direction opposite the first direction.

4 Claims, 6 Drawing Sheets

ELECTRONIC IMAGE DISPLAY SYSTEMS

CROSS-REFERENCE TO RELATED APPLICATIONS

The present application is a continuation application of, and claims priority from, prior application Ser. No. 11/084,665, filed Mar. 18, 2005, entitled "ELECTRONIC IMAGE DISPLAY SYSTEMS", which is related to and claims priority from prior provisional application Ser. No. 60/565,143, filed Apr. 23, 2004, entitled "ELECTRONIC IMAGE DISPLAY SYSTEMS", the contents of all of which are incorporated herein by this reference and are not admitted to be prior art with respect to the present invention by the mention in this cross-reference section.

BACKGROUND

This invention relates to providing useful arrangements of back-to-back display screens. This invention also relates to providing electronic image display systems for back-to-back display screens, particularly television display screens, and combined use of components, monitoring and control options. Further, this invention provides secure in-the-wall mounted back-to-back display screens that provide theft-resistant display systems in addition to providing built-in monitoring and control options for both a "parent" screen and a "child" screen.

Typically, electronic image display screens, such as computer monitors, television screens, laptop computer screens, etc., are single-sided or front-viewing-only, even when multiple same-facing screens are used. Furthermore, such multiple same-facing television and other screens are normally operated by independent operating mechanisms. Even further, parental controls for televisions have become more desired as programming has widened to include more adult content entertainment as well as child appropriate content. It would be useful for a parent to be able to view the child television selection in "real time" and also have control over such real time viewing. Further, it would be useful to have such parental control exhibited without the need for extensive wiring from one television set to another. Further, it would be useful for other purposes to display essentially-identical images on back-to-back screens for efficient viewing by more than one viewer.

Still further, certain television uses require a physically secured television to reduce theft. Such television systems, for example, within hotel suites, utilize a television in every room. For security purposes these televisions are often "locked" into expensive casings and their electrical connections are often "secured" by expensive connectors. It would be useful to have a single television system that would reduce costs by means of a multiple room display capability, and better security against theft. Even further, in certain adjoining rooms of certain hotel suites, etc., a parent may utilize one section of the suite and a child another. Parental controls, securing, and other advantages, such as stated above, would be useful in such back-to-back screen accommodations.

OBJECTS AND FEATURES OF THE INVENTION

A primary object and feature of the present invention is to overcome the above-mentioned problems and fulfill the above-mentioned needs.

A further object and feature of the present invention is to provide useful back-to-back electronic image displays.

It is a further object and feature of the present invention to provide such a system that provides an in-the-wall, back-to-back, securely mounted television system.

It is a further object and feature of the present invention to provide such a system that provides a parent viewing and control feature from a selected "parent" display screen to a selected "child" display screen.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a method, relating to displaying at least one electronic image on back-to-back oriented electronic image display screens, comprising the steps of: providing at least two electronic image display screens arranged in a back-to-back orientation within a unitary housing, such electronic image display screens arranged so that at least one displayed electronic image may be viewed simultaneously by at least two persons when such at least two persons are situated on opposite sides of at least one of the at least two electronic image display screens; permitting viewing of the at least one displayed electronic image by the at least two persons. Moreover, it provides such a method, further comprising the steps of permitting controlling, by a first person, such displayed electronic image.

In accordance with another preferred embodiment hereof, this invention provides an electronic image display system, relating to operable display of at least one electronic image, derived from at least one electronic image signal, comprising: at least one first electronic image display screen structured and arranged to permit at least one first at least one electronic image display of the at least one electronic image signal; at least one second electronic image display screen structured and arranged to permit at least one second at least one electronic image display of the at least one electronic image signal; a unitary housing adapted to house at least such at least one first electronic image display screen, such at least one second electronic image display screen and such at least one image display controller; wherein such at least one first electronic image display screen and such at least one second electronic image display screen are situate facing in substantially opposed directions within such unitary housing; and wherein such at least one first at least one electronic image display and such at least one second at least one electronic image display are geometrically oriented in substantially opposite directions. Additionally, it provides such an electronic image display system, further comprising at least one electronic image display controller structured and arranged to control the at least one electronic image signal onto at least one of such at least one first electronic image display screen and such second electronic image display screen. Also, it provides such an electronic image display system, wherein such at least one image display controller further comprises at least one parent controller adapted to assist at least one parent control of such operable display of at least one electronic image derived from the at least one electronic image signal. In addition, it provides such an electronic image display system, wherein such at least one image display controller further comprises: at least one child controller structured and arranged to restrict access of at least one portion of the at least one electronic image signal; wherein such child control is restricted by at least such at least one parent controller. And, it provides such an electronic image display system, wherein such at least one parent controller further comprises at least one image display selector structured and arranged to select the at least one electronic image signal to be displayed on at least one of such at least one first electronic image displayer and such at least one second electronic image displayer. Further, it provides such an electronic image display system, wherein such at least one image display selector further comprises at least one selective switch structured and arranged to selectively switch at least one portion of the at least one electronic image from such at least one first electronic image display screen to such at least one second electronic image display screen. Even further, it provides such an electronic image display system, wherein such at least one image display selector further comprises at least one selective switch structured and arranged to selectively switch at least one portion of the at least one electronic image from such at least one second electronic image display screen to such at least one first electronic image display screen. Moreover, it provides such an electronic image display system, wherein such at least one image display selector further comprises at least one picture-in-picture displayer for at least one picture-in-picture display of the at least one electronic image signal from either respective of such at least one first electronic image display screen or such at least one second electronic image display screen.

In accordance with another preferred embodiment hereof, this invention provides an electronic image display system, relating to operable display of at least one electronic image, derived from at least one electronic image signal, comprising: at least one first electronic image displayer structured and arranged to permit at least one first at least one electronic image display of the at least one electronic image signal; at least one second electronic image displayer structured and arranged to permit at least one second at least one electronic image display of the at least one electronic image signal; at least one electronic image display controller structured and arranged to control the at least one electronic image signal onto at least one of such at least one first electronic image displayer and such second electronic image displayer; and a unitary housing structured and arranged to house at least such at least one first electronic image displayer, such at least one second electronic image displayer and such at least one image display controller; wherein such at least one first electronic image displayer and such at least one second electronic image displayer are situate facing in substantially opposed directions within such unitary housing; and wherein such at least one first at least one electronic image display and such at least one second at least one electronic image display are geometrically oriented in substantially opposite directions. Additionally, it provides such an electronic image display system, wherein such at least one electronic image display controller further comprises at least one parent controller structured and arranged to assist parental control of the at least one electronic image signal. Also, it provides such an electronic image display system, wherein such at least one electronic image display controller further comprises at least one child controller structured and arranged to restrict access of at least one portion of the at least one electronic image signal. In addition, it provides such an electronic image display system, wherein such at least one parent controller comprises such at least one child controller.

In accordance with another preferred embodiment hereof, this invention provides an electronic image display system, relating to operable display of at least one electronic image, derived from at least one electronic image signal, on at least one of at least two electronic image display screens, comprising: first electronic image display means for displaying the at least one electronic image on at least one first electronic image display screen of the at least two electronic image display screens; second electronic image display means for displaying the at least one electronic image on at least one second electronic image display screen of the at least two electronic image display screens; electronic image display controller means for controlling the at least one electronic image signal onto at least one of such first electronic image display means and such second electronic image display means; and unitary housing means for housing at least such first electronic image display means, such second electronic image display means, and such image display controller means; wherein such first electronic image display means and such second electronic image display means are situate facing in opposed directions within such unitary housing means. And, it provides such an electronic image display system, wherein such image display controller means further comprises parent controller means for assisting at least one parental control of such operable display of at least one electronic image derived from the at least one electronic image signal. Further, it provides such an electronic image display system, wherein such image display controller means further comprises: child controller means for assisting at least one child control of such operable display of at least one electronic image derived from the at least one electronic image signal; wherein such child control is restricted by at least such parent controller means. Even further, it provides such an electronic image display system, wherein such parent controller means further comprises image display selector means for selecting the at least one electronic image signal to be displayed on at least one of such first electronic image display means and such second electronic image display means. Even further, it provides such an electronic image display system, further comprising selective switching means for selectively switching at least one portion of the at least one electronic image from such first electronic image display means to such second electronic image display means. Even further, it provides such an electronic image display system, further comprising selective switching means for selectively switching at least one portion of the at least one electronic image from such second electronic image display means to such first electronic image display means.

In accordance with a preferred embodiment hereof, this invention provides an electronic image display system, relating to operable display of at least one electronic image, derived from at least one electronic image signal, on at least one of at least two electronic image display screens, comprising: first electronic image display means for displaying the at least one electronic image on at least one first electronic image display screen of the at least two electronic image display screens; second electronic image display means for displaying the at least one electronic image on at least one second electronic image display screen of the at least two electronic image display screens; electronic image display controller means for controlling the at least one electronic image signal onto at least one of such first electronic image display means and such second electronic image display means; and unitary housing means for housing at least such first electronic image display means, such second electronic image display means, and such image display controller means; wherein such housing means comprises wall installation means for assisting in-wall mounting of such unitary housing means; and wherein such first electronic image display means and such second electronic image display means are situate facing in opposed directions within such unitary housing means.

Moreover, it provides such an electronic image display system wherein such housing means comprises adjuster means for adjusting such housing means to situate such first electronic image display means and such second electronic image display means essentially parallel with a partition wall having at least one respective first side and at least one opposing second side.

Additionally, it provides such an electronic image display system wherein such image display controller means further comprises parent controller means for assisting at least one parental control of such operable display of at least one electronic image derived from the at least one electronic image signal. Also, it provides such an electronic image display system wherein such image display controller means further comprises: child controller means for assisting at least one child control of such operable display of at least one electronic image derived from the at least one electronic image signal; wherein such child control is restricted by at least such parent controller means.

In addition, it provides such an electronic image display system wherein such parent controller means further comprises image display selector means for selecting the at least one electronic image signal to be displayed on at least one of such first electronic image display means and such second electronic image display means. And, it provides such an electronic image display system wherein such image display selector means further comprises selective switching means for selectively switching at least one portion of the at least one electronic image from such first electronic image display means to such second electronic image display means.

Further, it provides such an electronic image display system wherein such image display selector means further comprises selective switching means for selectively switching at least one portion of the at least one electronic image from such second electronic image display means to such first electronic image display means. Even further, it provides such an electronic image display system wherein such image display selector means further comprises picture-in-picture display means for picture-in-picture display of the at least one electronic image signal from either respective of such first electronic image display means or such second electronic image display means.

In accordance with another preferred embodiment hereof, this invention provides an electronic image display system, relating to operable display of at least one electronic image, derived from at least one electronic image signal, comprising: at least one first electronic image display screen structured and arranged to permit at least one first at least one electronic image display of the at least one electronic image signal; at least one second electronic image display screen structured and arranged to permit at least one second at least one electronic image display of the at least one electronic image signal; at least one electronic image display controller structured and arranged to control the at least one electronic image signal onto at least one of such at least one first electronic image display screen and such second electronic image display screen.

And it provides a unitary housing adapted to house at least such at least one first electronic image display screen, such at least one second electronic image display screen and such at least one image display controller; wherein such unitary housing comprises at least one wall installer structured and arranged to assist wall-mounting of such unitary housing; wherein such at least one first electronic image display screen and such at least one second electronic image display screen are situate facing in substantially opposed directions within such unitary housing; and wherein such at least one first at least one electronic image display and such at least one second at least one electronic image display are geometrically oriented in substantially opposite directions.

Moreover, it provides such an electronic image display system wherein such unitary housing comprises at least one adjuster adapted to adjust such unitary housing to situate such at least one first electronic image display screen and such at least one second electronic image display screen essentially parallel with a partition wall having at least one respective first side and at least one opposing second side. Additionally, it provides such an electronic image display system wherein such at least one image display controller further comprises: at least one parent controller adapted to assist at least one parent control of such operable display of at least one electronic image derived from the at least one electronic image signal.

Also, it provides such an electronic image display system wherein such at least one image display controller further comprises: at least one child controller structured and arranged to restrict access of at least one portion of the at least one electronic image signal; wherein such child control is restricted by at least such at least one parent controller. In addition, it provides such an electronic image display system wherein such at least one parent controller further comprises at least one image display selector structured and arranged to select the at least one electronic image signal to be displayed on at least one of such at least one first electronic image displayer and such at least one second electronic image displayer. And, it provides such an electronic image display system wherein such at least one image display selector further comprises at least one selective switch structured and arranged to selectively switch at least one portion of the at least one electronic image from such at least one first electronic image display screen to such at least one second electronic image display screen.

Further, it provides such an electronic image display system wherein such at least one image display selector further comprises at least one selective switch structured and arranged to selectively switch at least one portion of the at least one electronic image from such at least one second electronic image display screen to such at least one first electronic image display screen.

Even further, it provides such an electronic image display system wherein such at least one image display selector further comprises at least one picture-in-picture displayer for at least one picture-in-picture display of the at least one electronic image signal from either respective of such at least one first electronic image display screen or such at least one second electronic image display screen. Even further, it provides such an electronic image display system wherein such at least one wall installer comprises at least one theft-resistant device adapted to secure such unitary housing to at least one wall.

In accordance with another preferred embodiment hereof, this invention provides an electronic image display system, relating to operable display of at least one electronic image, derived from at least one electronic image signal, comprising: at least one first electronic image displayer structured and arranged to permit at least one first at least one electronic image display of the at least one electronic image signal; at least one second electronic image displayer structured and arranged to permit at least one second at least one electronic image display of the at least one electronic image signal; at least one electronic image display controller structured and arranged to control the at least one electronic image signal onto at least one of such at least one first electronic image displayer and such second electronic image displayer; and a unitary housing adapted to house at least such at least one first electronic image displayer, such at least one second electronic image displayer and such at least one image display controller; wherein such unitary housing comprises at least one wall installer structured and arranged to assist wall-mounting of such unitary housing; wherein such at least one first electronic image displayer and such at least one second electronic image displayer are situate facing in substantially opposed directions within such unitary housing; wherein such at least one first at least one electronic image display and such at least one second at least one electronic image display are geometrically oriented in substantially opposite directions; and wherein such at least one electronic image display controller further comprises at least one parent controller structured and arranged to assist parental control of the at least one electronic image signal.

Even further, it provides such an electronic image display system wherein such at least one electronic image display controller further comprises at least one child controller structured and arranged to restrict access of at least one portion of the at least one electronic image signal. Even further, it provides such an electronic image display system wherein such at least one parent controller comprises such at least one child controller. Furthermore, this invention provides each and every novel feature, element, combination, step and/or method disclosed or suggested by this provisional patent application.

DETAILED DESCRIPTION OF THE BEST MODES AND PREFERRED EMBODIMENTS OF THE INVENTION

Figure 1:
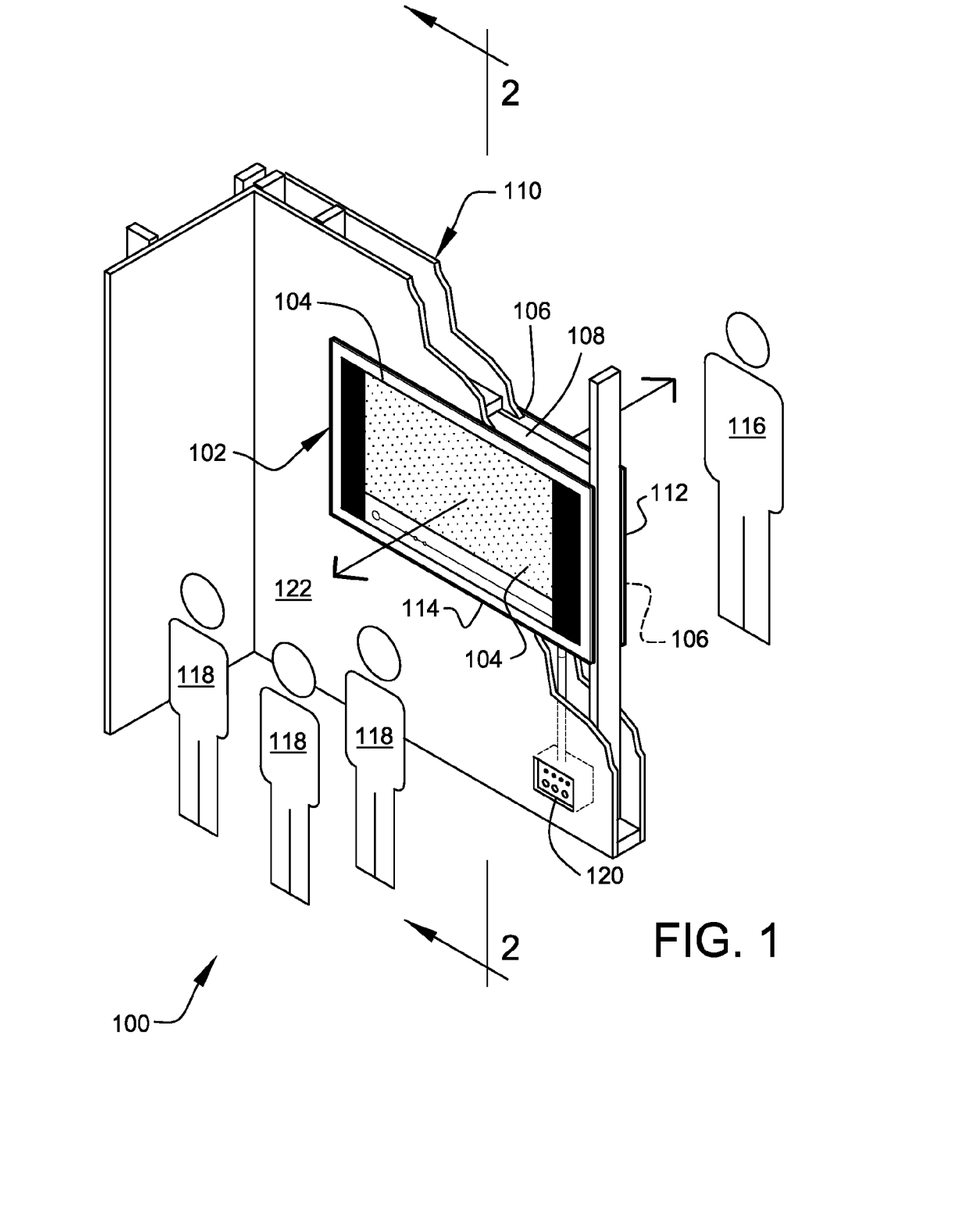
FIG. 1 shows a perspective view of the electronic image display system according to a preferred embodiment of the present invention.

FIG. 1 shows a perspective view of the electronic image display system 100 according to a preferred embodiment of the present invention. Preferably, the electronic image display system 100 comprises a unitary back-to-back television 102, preferably as shown. Preferably, the unitary back-to-back television 102 comprises a first side 104 and a second side 106, preferably mounted in a single housing 108, as shown. Upon reading the teachings of this specification, those of ordinary skill in the art will now understand that, under appropriate circumstances, considering such issues as intended use, design modifications, hardware available, consumer trends, etc., other image display systems having a back-to-back display orientation, such as, computer desktop monitors, laptop computers, electronic signs, electronic picture frames, video game monitors, handheld phones, mobile phones, portable media players with screens, other back-to-back image display systems, etc., may suffice.

Preferably, the unitary back-to-back television 102 is securely mounted within a partition wall 110, as shown. Most preferably, to assist secure theft-resistant installation, no apparent bolts (or similar installation hardware) are visible, including wiring. Upon reading the teachings of this specification, those with ordinary skill in the art will now understand that, under appropriate circumstances, considering such issues as economics, user preference, room use, etc., other back-to-back television and computer housing and mounting means, such as a hanging housing and mount, pedestal mount, floor mounted, ceiling mounted, ceiling suspended, window-mounted, protruding from a wall, free standing, etc., may suffice.

Most preferably, the unitary back-to-back television 102 comprises a parent unit 112 (shown as a second side), preferably controlled by a controlling user, such as adult 116, and a child unit 114 (shown as first side 104). Preferably, child unit 114 is also controllable by an adult 116, with adult-selectable levels of control permitted to users, such as children 118, as shown. Upon reading the teachings of this specification, those with ordinary skill in the art will now understand that, under appropriate circumstances, considering such issues as economics, user preference, country of use, etc., other arrangements, such as dual use televisions or other electronic image screens, back-to-back screens under control of a "parent" figure (such as a judge, doctor, lawyer, therapist, accountant, employer, etc.), using such control with a "child" figure (such as a jury, defendant, patient, client, therapy receiver, business accounting viewer, or employee, etc.), no parent/child controller hierarchy, etc., may suffice. Most preferably, the parent unit 112 provides a picture-in-picture arrangement to permit viewing of the display contents of the child unit 114 screen by use of a picture-in-picture arrangement on the parent unit 112 or simply by switching the parent unit 112 controls to provide for the display contents of the child unit 114 screen to appear on the parent unit 112 screen (embodying herein wherein such image display selector means further comprises picture-in-picture display means for picture-in-picture display of the at least one electronic image signal from either respective of such first electronic image display means or such second electronic image display means; and embodying herein wherein such at least one electronic image display selector further comprises at least one picture-in-picture displayer for at least one picture-in-picture display of the at least one electronic image signal from either respective of such at least one first electronic image displayer or such at least one second electronic image displayer). Parent unit 112 also refers herein to any controlling authority over which control of the secondary or child unit 114 is provided.

Preferably, the electronic image display system 100 further comprises an auxiliary panel 120, preferably for connecting auxiliary devices to the unitary back-to-back television 102 (such as DVD players, games, computers, etc.). Preferably, auxiliary panel 120 is located adjacent the unitary back-to-back television 102, preferably wall mounted and flush with the face 122 of the wall, as shown. Upon reading the teachings of this specification, those with ordinary skill in the art will now understand that, under appropriate circumstances, considering such issues as economics, user preference, etc., other auxiliary panel arrangements, such as face mounted as part of a unitary back-to-back television, mounted in another room, mounted in an adjacent cabinet, etc., may suffice.

Figure 2:
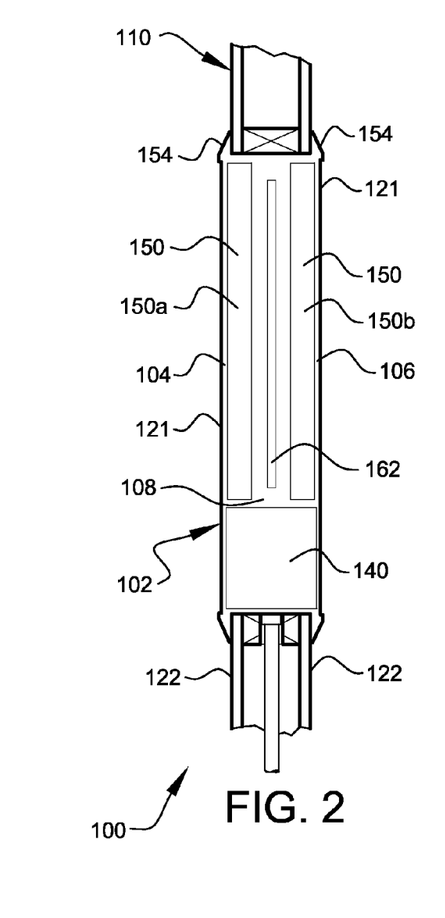
FIG. 2 shows a diagrammatic section view through section 2-2 of FIG. 1.

FIG. 2 shows a sectional view through the section 2-2 of FIG. 1. Section 2-2 diagrammatically illustrates a preferred arrangement of the principal components comprising television system 100 (shown in a wall mount). Preferably, electronic image display system 100 comprises two opposing display screens 150, as shown. Preferably, each display screen 150 comprises a single flat panel display module 150*a* and 150*b* respectively, as shown. Preferably, flat panel module 150*a* (embodying herein first electronic image display means for displaying the at least one electronic image on at least one first electronic image display screen of the at least two electronic image display screens; and embodying herein at least one first electronic image displayer structured and arranged to display the at least one electronic image on at least one first electronic image display screen of the at least two electronic image display screens) is located to permit viewing at first side 104 and flat panel module 150*b* (embodying herein second electronic image display means for displaying the at least one electronic image on at least one second electronic image display screen of the at least two electronic image display screens; and embodying herein at least one second electronic image displayer structured and arranged to display the at least one electronic image on at least one second electronic image display screen of the at least two electronic image display screens) is located to permit viewing at second side 106, as shown. Preferably, television system 100 comprises at least one electronic sub-system, preferably circuit board 162, adapted to provide coordination-and-control operations for both flat panel module 150*a* and flat panel module 150*b*, as shown (this arrangement embodies herein electronic image display controller means for controlling the at least one electronic image signal onto at least one of such first electronic image display means and such second electronic image display means; and embodies herein at least one electronic image display controller structured and arranged to control the at least one electronic image signal onto at least one of such at least one first electronic image displayer and such second electronic image displayer). Similarly, a single common power source 140 is preferably used to supply power to circuit board 162, flat panel module 150*a*, flat panel module 150*b* and other related sub-systems of electronic image display system 100 (as further described in FIG. 8). Upon reading the teachings of this specification, those with ordinary skill in the art will now understand that, under appropriate circumstances, considering such issues as economics, user preference, durability, electrical codes, etc., other power source arrangements, such as, for example, using a dedicated power source for each display, etc., may suffice.

Preferably, the internal components comprising electronic image display system 100 are mounted within a single housing 108, preferably a unitary housing, as shown (embodying herein unitary housing means for housing at least such first electronic image display means, such second electronic image display means, and such image display controller means; and embodying herein a unitary housing adapted to house at least such at least one first electronic image displayer, such at least one second electronic image displayer and such at least one image display controller). Upon reading the teachings of this specification, those with ordinary skill in the art will now understand that, under appropriate circumstances, considering such issues as economics, user preference, manufacturing preference, etc., other housing arrangements, such as dual housings connected together as a single housing unit, offset back-to-back screens in a single housing unit, inverted screens in a single housing unit, etc., may suffice.

Preferably, housing 108 is mounted securely within wall partition 122, as shown. Preferably, the exterior planar surface 121 of each respective first side 104 and second side 106 is mounted about flush with the wall 122 (embodying herein wherein such housing means comprises wall installation means for assisting wall-mounting of such unitary housing means; and embodying herein wherein such unitary housing comprises at least one wall installer structured and arranged to assist wall-mounting of such unitary housing). Most preferably, each respective first side 104 and second side 106 is mounted about flush with the wall 122 situate facing in opposed directions within the unitary housing 108, as shown (embodying herein wherein such first electronic image display means and such second electronic image display means are situate facing in opposed directions within such unitary housing means; and embodying herein wherein such at least one first electronic image displayer and such at least one second electronic image displayer are situate facing in opposed directions within such unitary housing). Upon reading the teachings of this specification, those with ordinary skill in the art will now understand that, under appropriate circumstances, considering such issues as economics, user preference, wall thickness, country of use, building codes, etc., other mounting arrangements, such as protruding from the wall in lieu of flush with the wall, etc., may suffice.

Figure 3:
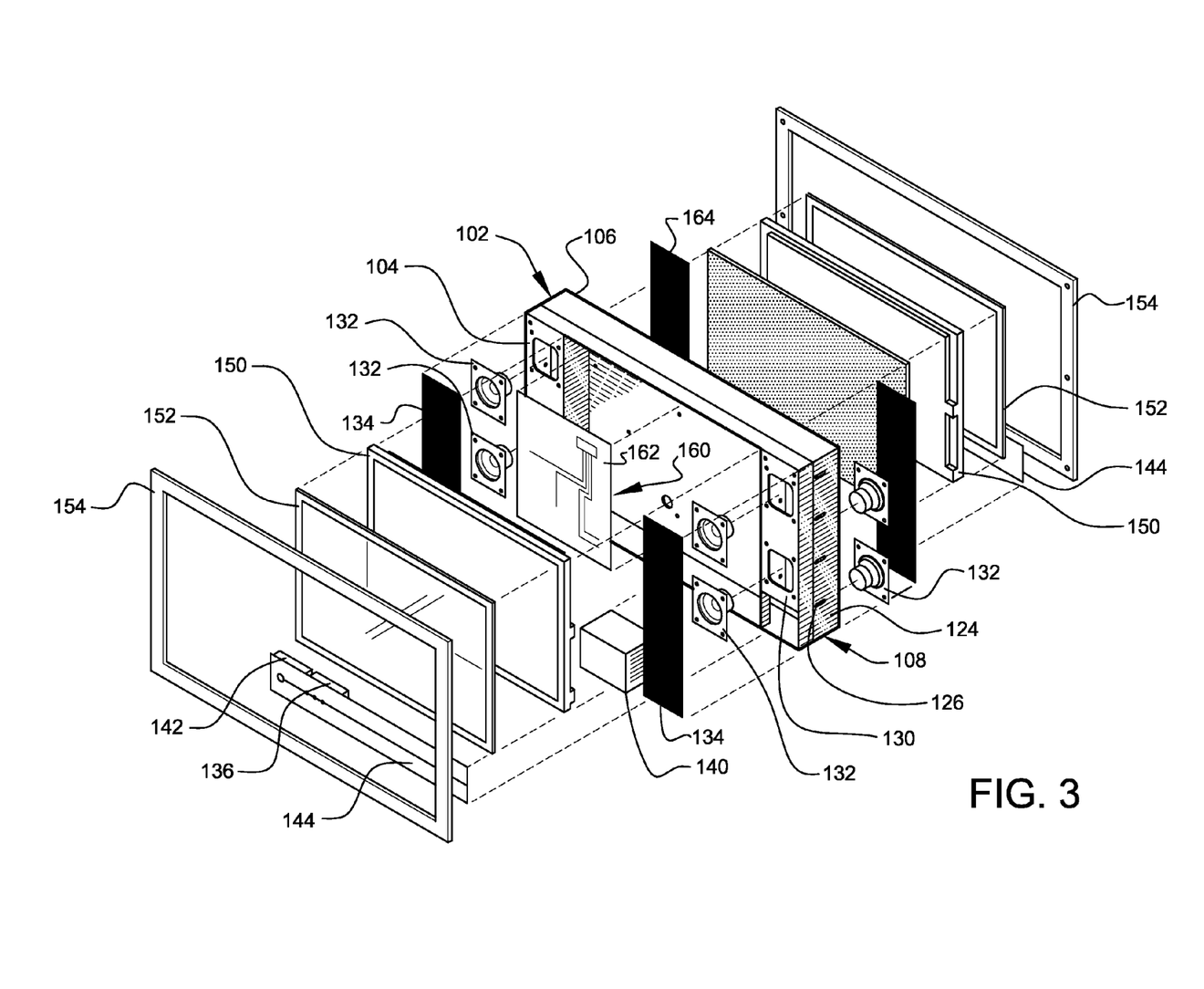
FIG. 3 shows an exploded perspective view of a back-to-back television of the electronic image display system of FIG. 1.

FIG. 3 shows an exploded perspective view of a back-to-back television of the electronic image display system 100 of FIG. 1 according to a preferred embodiment of the present invention. Preferably, the unitary back-to-back television 102 comprises multiple components as described below. Upon reading the teachings of this specification, those with ordinary skill in the art will now understand that, under appropriate circumstances, considering such issues as economics, user preference, durability, nation of use, desired function, etc., other components and arrangements, such as other back-to-back display uses with other screens such as computer and laptop computer screens, may suffice.

Preferably, the housing 108 comprises an adjustable sub-assembly 124 (embodying herein wherein such housing means comprises adjuster means for adjusting such housing means to situate such first electronic image display means and such second electronic image display means essentially parallel with a partition wall having at least one respective first side and at least one opposing second side; and embodying herein wherein such unitary housing comprises at least one adjuster adapted to adjust such unitary housing to situate such at least one first electronic image displayer and such at least one second electronic image displayer essentially parallel with a partition wall having at least one respective first side and at least one opposing second side), preferably comprising mounting slots 126 to adjust the housing 108 within the partition wall 110 (for example, to accommodate slight variations within wall thicknesses) such that the exterior planar surface 121 of each respective first side 104 and second side 106 is mounted about flush with the wall 122. Preferably, housing 108 comprises two essentially identical portions, the first side 104 and second side 106, as shown. Preferably, both the first side 104 and second side 106, of the housing 108 comprises at least one and preferably two sound cabinets 130, comprising multiple sound speakers 132, speaker grilles 134 and sound controls 136 to provide sound separately to each of the first side 104 and second side 106 portions, as shown. Upon reading the teachings of this specification, those with ordinary skill in the art will now understand that, under appropriate circumstances, considering such issues as economics, user preference, etc., other sound arrangements, such as output of the sound signals to an outside speaker system, etc., may suffice.

Preferably, the housing further comprises at least one power source 140 and at least one power source controller 142, preferably having a control along each respective the front panel 144 and a remote controller 146 (see FIG. 4) for each respective first side 104 and second side 106.

As described in FIG. 2, each respective first side 104 and second side 106 preferably comprise display screen 150, preferably a flat screen display, preferably a Liquid Crystal Display (LCD) module such as TFT LCD modules available from Samsung Corporation (www.samsung.com). Preferably, a protective EMI (electromagnetic interference) glass shield 152 is placed over each respective display screen 150. Preferably, a face frame 154 is then utilized to assist providing a finished look between the partition wall 110 and the housing 108, and to protectively cover system attachment points, as shown. Upon reading the teachings of this specification, those with ordinary skill in the art will now understand that, under appropriate circumstances, considering such issues as economics, user preference, wall thickness, preferred finish, etc., other face frame arrangements, such as, for example, decorative frames, frames integral with the housing, frameless designs, etc., may suffice.

Preferably, each respective first side 104 and second side 106 further comprise operating circuitry 160, illustrated by circuit board 162 to operate the displays (as described in FIG. 2 and as further described in FIG. 8 below).

Preferably, sound isolation batting 164 (shown on one side only as a minimum but may be used on both sides) is placed between the first side 104 and second side 106 to assist deadening sound between the first side 104 and second side 106, as shown. Most preferably, sound insulation batting 164 is also placed behind each set of sound speakers 132 (see FIG. 6). Upon reading the teachings of this specification, those with ordinary skill in the art will now understand that, under appropriate circumstances, considering such issues as economics, user preference, etc., other sound attenuating methods or apparatus, such as, the use of sound deadening housing materials, sound attenuating structures, electronic sound canceling, etc. may suffice.

Figure 4:
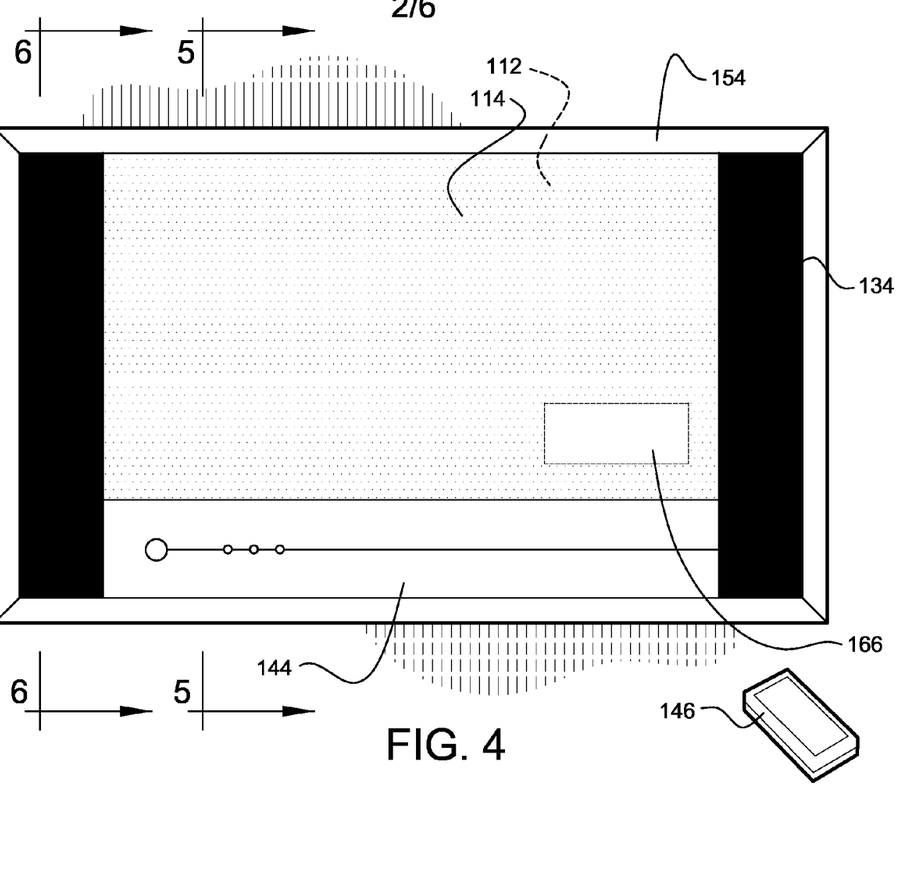
FIG. 4 shows a front facing view of a second side of the back-to-back television of the electronic image display system of FIG. 1.

FIG. 4 shows a front facing view of a second side of the back-to-back television of the electronic image display system 100 of FIG. 1. Preferably, the electronic image display system 100 is adapted to accept wireless remote controller 146 commands. Upon reading the teachings of this specification, those with ordinary skill in the art will now understand that, under appropriate circumstances, considering issues such as circuit design preferences, intended application, etc., other remote control arrangements may suffice, such as, for example, direct control of the video controllers, use of non-wireless remote control or laser communication technologies, etc.

Preferably, at least one remote controller 146 operates at both the parent unit 112 and child unit 114 (embodying herein wherein such at least one parent controller means comprises such at least one child controller means; and embodying herein wherein such at least one parent controller comprises such at least one child controller). Preferably, the child unit 114 is programmable directly and also by the remote controller 146 at the parent unit 112 to provide the child unit 114 with limited controls as to channel selection (limited by the overriding parental controls), audio control, video source switching, child 114 on/off controls, etc. Conversely and preferably, remote controller 146 at the parent unit 112 comprises full access and control of all features on both the parent unit 112 and child unit 114, including all parental control features not available to the first side remote controller. The above-described arrangement embodies herein wherein such at least one parent controller means further comprises image display selector means for selecting the at least one electronic image signal to be displayed on at least one of such first electronic image display means and such second electronic image display means; and embodies herein wherein such image display selector means further comprises selective switching means for selectively switching at least one portion of the at least one electronic image from such first electronic image display means to such second electronic image display means; and also embodies herein wherein such at least one parent controller further comprises at least one image display selector structured and arranged to select the at least one electronic image signal to be displayed on at least one of such at least one first electronic image displayer and such at least one second electronic image displayer; and embodies herein wherein such at least one image display selector further comprises at least one selective switch structured and arranged to selectively switch at least one portion of the at least one electronic image from such at least one first electronic image displayer to such at least one second electronic image displayer.

Most preferably, each respective parent unit 112 and child unit 114 provides picture-in-picture (PIP) 166 arrangements for viewing. Preferably, the parent unit 112 further comprises at least one function to assist monitoring the child unit 114, as described.

Figure 5:
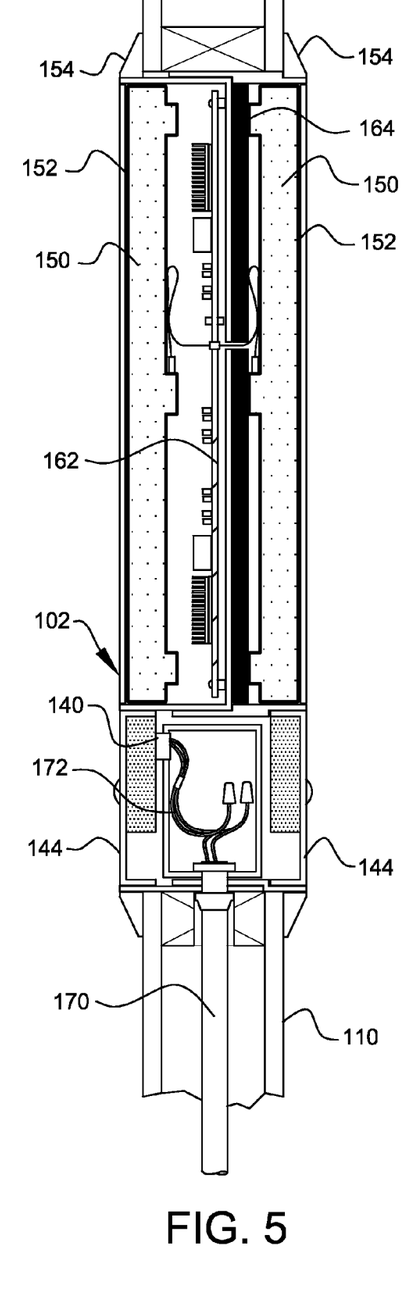
FIG. 5 shows a section view through section 5-5 of FIG. 4.

FIG. 5 shows a section view through section 5-5 of FIG. 4. FIG. 5 illustrates additional preferred components as discussed herein in addition to a preferred power wiring arrangement. In addition, preferred electronic image display system components, as discussed above, are also illustrated in FIG. 5.

Preferably, the unitary back-to-back television 102 is powered by running conduit 170 up through the partition wall 110 and either connecting the power wiring 172 direct to the unitary back-to-back television 102 or installing an outlet. Upon reading the teachings of this specification, those with ordinary skill in the art will now understand that, under appropriate circumstances, considering such issues as building construction, user preference, local codes, etc., other powering source arrangements, such as, for example, introducing power from the top or sides, accessing power by means of a plug and socket arrangement, etc., may suffice.

Figure 6:
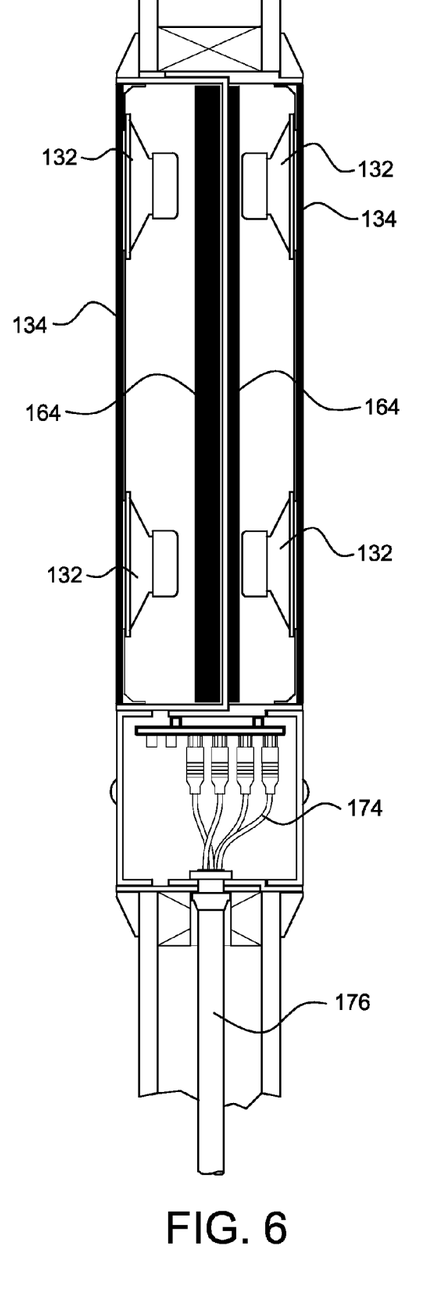
FIG. 6 shows a section view through section 6-6 of FIG. 4.

FIG. 6 shows a section view through section 6-6 of FIG. 4. FIG. 6 illustrates additional components as discussed herein in addition to other preferred wiring arrangements. Preferably, the auxiliary panel 120 is connected to the unitary back-to-back television 102 through cabling 174 installed hidden through conduit 176, as shown. Upon reading the teachings of this specification, those with ordinary skill in the art will now understand that, under appropriate circumstances, considering such issues as economics, user preference, etc., other auxiliary panel connections, such as, for example, wireless, plug-ins, etc., may suffice.

Figures 7A, 7B:
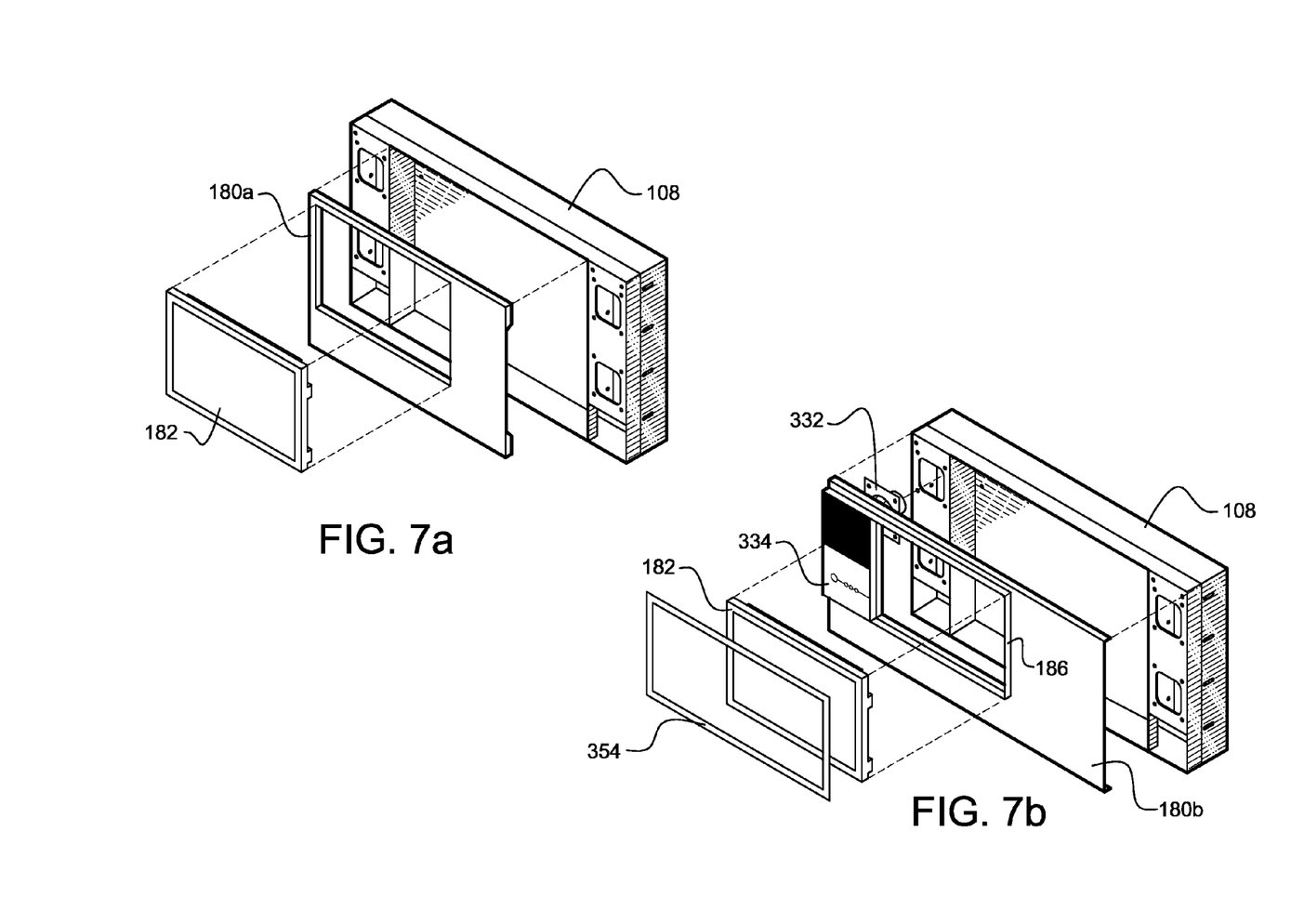
FIG. 7a shows a perspective view of a sizing screen according to another embodiment of the present invention.
FIG. 7b shows a perspective view of an alternate sizing screen according to another embodiment of the present invention.

FIG. 7*a* shows a perspective view of a reduced size screen option according to another preferred embodiment of the present invention. FIG. 7*b* shows a perspective view of an alternate reduced size screen option according to another preferred embodiment of the present invention. The previously-described unitary back-to-back television 102 preferably comprised equal-sized viewing screens; however, some users may prefer uniquely different sizing arrangements.

Preferably, sizing screen panel 180*a* is adapted to permit alternate format/size of display screen 182 (relative to the opposing display screen) to be fitted to standard-sized single housing 108, as shown. Preferably, sizing screen panel 180*a* is adapted to be locatable within single housing 108 in place of the full size display screen, as shown.

In an alternate preferred embodiment, screen panel 180*b* comprises a full-face panel essentially covering one side of single housing 108, as shown. Preferably, screen panel 180*b* permits installation of at least one alternate format/size display screen 182 using a smaller penetration through partition wall 110, as shown.

Screen panel 180*b* is preferably located substantially within partition wall 110. Installation of screen panel 180*b* is accomplished by cutting an appropriately sized penetration within face 122 of partition wall 110 to pass adjustable mounting flange 186. On fitting screen panel 180*b* to wall 110, alternate format/size display screen 182 is preferably secured to the interior of screen panel 180*b*, as shown.

Preferably, screen panel 180*b* comprises sound speaker 332 and integral front panel controls 344, as shown. Preferably, a small format face frame 354 is utilized to assist providing a finished look between the partition wall 110 and housing 108. Upon reading the teachings of this specification, those with ordinary skill in the art will now understand that, under appropriate circumstances, considering issues such as intended application, user preference, etc., other display size adapter arrangements may suffice, such as, for example, electronic image display system may preferably provide a programmably adjustable screen size and sizing screen panel, with a frame insert to frame the desired screen size as might be found in laptop or other computers.

In the following figure, well-known structures and devices may be illustrated in block diagram form in order to provide an understanding of the interrelationship between components and the flow of signals and control throughout the depicted preferred embodiment of the present invention. It will be apparent to those skilled in the art from the teachings herein that the invention may be practiced with a variety of different specific components, without detraction or departure from the scope of the present invention, provided to serve the generalized block diagram description. Specific statements made with respect to any of these operations are intended to clarify the nature of the operation being performed, but should not be taken as a limitation of the operation should an alternative operation be desired in a substantially similar situation or setting.

Figure 8:
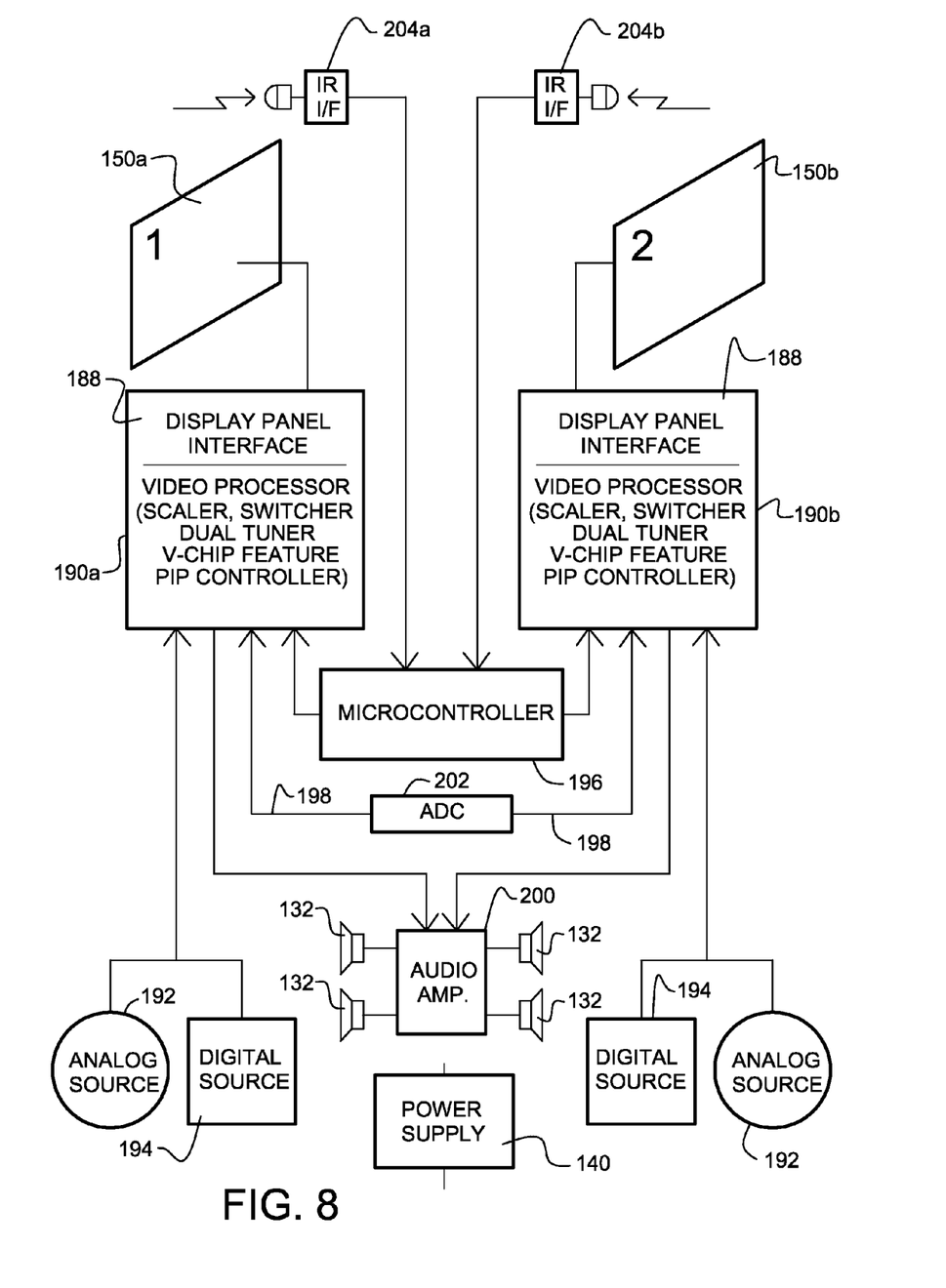
FIG. 8 is a block diagram generally illustrating the interrelationship between principal internal components of the television system of FIG. 1 according to a preferred embodiment of the present invention.

FIG. 8 is a block diagram generally illustrating the interrelationship between functional components of the preferred embodiment of FIG. 1. Prior to describing the sub-systems of FIG. 8, a brief discussion presenting the preferred operation of electronic image display system 100 is provided. Referring to both FIG. 8 and FIG. 1, electronic image display system 100 is preferably adapted to permit selective display of multiple video signals at one or both of flat panel module 150*a* and flat panel module 150*b*, as shown. Preferably, one of the two flat panel modules is user selectable as parent unit 112 (embodying herein wherein such image display controller means further comprises at least one parent controller means for assisting parental control of the at least one electronic image signal; and embodying herein wherein such at least one electronic image display controller further comprises at least one parent controller structured and arranged to assist). Preferably, electronic image display system 100 is adapted to permit PIP-style monitoring of all signal feeds to child unit 114. Preferably, parent unit 112 is further adapted to permit full user control over the display content and operation of the other flat panel module (child unit 114), thereby restricting content available to the child unit 114. The above-described arrangement embodies herein wherein such image display controller means further comprises at least one child controller means for restricting access of at least one portion of the at least one electronic image signal; and embodies herein wherein such at least one electronic image display controller further comprises at least one child controller structured and arranged to restrict access of at least one portion of the at least one electronic image signal.

Preferably, flat panel module 150*a* and flat panel module 150*b* are each driven by a respective dedicated video processor 190*a* and video processor 190*b*, as shown. Preferably, both video processor 190*a* and video processor 190*b* each comprise an appropriate display panel interface 188 adapted to format the video signal for the display screen type. Additionally, both video processor 190*a* and video processor 190*b* each preferably comprise a dual TV tuner, PIP controller, A/V switcher, and V-Chip feature, as shown. Upon reading the teachings of this specification, those with ordinary skill in the art will now understand that, under appropriate circumstances, considering issues such as cost, user preference etc., other video controller component arrangements may suffice, such as, for example, the inclusion of an on-board scaling mechanism, on-screen display support, FM tuners, etc.

Preferably, each dual TV tuner processes standard NTSC signals (181 channels within a 55.25 to 801.25 MHz, or 62.5 kHz range). Further, system 100 is preferably adaptable to international PAL and SECAM turner standards.

Video processor 190*a* and video processor 190*b* are each preferably adapted to accept both analog video signals 192 and digital video signals 194, as shown. Preferably, video processor 190*a* and video processor 190*b* are each adapted to accept a range of video signal types including, Composite, S-Video, YPbPr, RGBHV and DVI/HDCP. Video processor 190*a* and video processor 190*b* are each preferably adapted to accept a range of cabling formats not limited to "F"-type female (75 OHM), 4-pin mini DIN female (S-Video-1, S-Video-2), RCA phono female to 4-pin mini DIN male adapters (Composite 1, Composite 2), BNC-type male using DVI breakout cables (RGBHV/YPbPr) and DVI-D. Preferably, video processor 190*a* and video processor 190*b* are each preferably adapted to output a range of video signal formats including, RGBHV/YPbPr.

Preferably, both video processor 190*a* and video processor 190*b* are each similar in specification to commercially available units such as, for example, an XtunePro controller manufactured by Aurora Multimedia (www.auroramultimedia.com). Upon reading the teachings of this specification, those with ordinary skill in the art will now understand that, under appropriate circumstances, considering issues such as production costs, system format/size, etc., other video controller arrangements may suffice, such as, for example, combining video processor 190*a* and video processor 190*b* within a single board, as might be found on a laptop or other computer.

Preferably, the functions and operations of video processor 190*a* and video processor 190*b* are coordinated by means of microcontroller 196, as shown. Preferably, microcontroller 196 is adapted to communicate with video processor 190*a* and/or video processor 190*b* via at least one electrical signal pathway. For example, preferred embodiments of microcontroller 196 are adapted to communicate with video processor 190*a* and/or video processor 190*b* using a serial data interface and RS-232 protocols. Preferably, microcontroller 196 comprises a self-contained PC-based main board having at least two communication ports comprising RS-232 transceivers, and program memory. Preferably, microcontroller 196 is similar in specification to commercially available units such as, for example, Mini ITX boards produced by VIA Technologies, Inc. (viaembedded.com). Upon reading the teachings of this specification, those with ordinary skill in the art will now understand that, under appropriate circumstances, considering issues such as board design, advances in technology, etc., other microcontroller arrangements, such as, for example, combining video processor functions with microprocessor functions on a single board, using a proprietary control board comprising, as a minimum, a single microcontroller with non-volatile memory, etc., may suffice.

Preferably, video processor 190a is adapted to interoperate with video processor 190b by means of a by-directional signal bridge 198, as shown. Preferably, signal bridge 198 supports both analog channels as well as digital channels. Preferably, signal bridge 198 comprises at least one analog/digital converter 202 to permit exchange of video signals between video processor 190a and video processor 190b regardless of the video source or format, as shown. Upon reading the teachings of this specification, those with ordinary skill in the art will now understand that, under appropriate circumstances, considering issues such as cost, function, advances in technology, etc., other video signal exchange arrangements, such as, for example, designing systems to accept digital-only or analog-only video signals, including ADC functions within each video processor rather than the bridge, etc., may suffice.

Preferably, video processor 190a and video processor 190b each output audio signals to audio amplifier 200, as shown. Preferably, audio amplifier 200 comprises at last a two-channel, preferably a four-channel stereo amplifier, as shown. Preferably, audio amplifier 200 is adaptable to support multi-channel audio arrangements such as digital surround sound. Preferably, an internal audio channel bridge between video processor 190a and video processor 190b is provided to permit parental monitoring of "audio-only" content at child unit 114. Upon reading the teachings of this specification, those with ordinary skill in the art will now understand that, under appropriate circumstances, considering issues such as function, cost etc., other audio arrangements, such as, for example, providing an intercom connection between first side and second side, etc., may suffice.

Video processor 190a and video processor 190b are each preferably adapted to accept wireless remote user control commands, as shown. Preferably, IR interface 204a and IR interface 204b are adapted to communicate with microcontroller 196 using infrared (IR) signals, as shown. Upon reading the teachings of this specification, those with ordinary skill in the art will now understand that, under appropriate circumstances, considering issues such as circuit design preferences, intended application, etc., other wireless remote control arrangements may suffice, such as, for example, direct wireless control of the video controllers, use of RF or laser communication technologies, etc.

Preferably, IR interface 204b receives wireless IR signals from remote controller 146 (as described in FIG. 4 above). Similarly, IR interface 204a receives remote control signals from a matching remote controller operating at the opposing display at first side 104. Preferably, matching remote controller operating at the opposing display at first side 104 is programmable to provide control limited to channel selection (limited by overriding parental controls), audio control, video source switching (limited to first side video sources), first side on/off controls. Preferably, remote controller 146 comprises access to full unit control including parental control features not available to the first side remote controller.

Currently, the FCC has adopted rules requiring all television sets with picture screens thirty-three centimeters (about thirteen inches) or larger to be equipped with features to block the display of television programming based upon the program rating. Preferably, the V-chip reads information encoded in the rated program and blocks programs from the set based upon the rating selected by the parent. Preferably, remote controller 146 permits access to the V-chip functions embedded within video processor 190a and video processor 190b, as shown.

Preferably, remote controller 146 provides access to PIP features of electronic image display system 100. Preferably, electronic image display system 100 supports a range of PIP modes including, Single PIP, Translucent PIP, side-by-side display and tiled. The preferred PIP functions permit continuous monitoring of child unit 114 by selective PIP display of video content of first side 104. Moreover, remote controller 146 permits direct control over all functions of child unit 114. For example, if adult 116 determines that the displayed content at child unit 114 is inappropriate, adult 116 may, by means of remote controller 146, change the display content, or turn off child unit 114 entirely.

Furthermore, microcontroller 196 is preferably programmable to permit adult user selection of parent unit/child unit display assignment by means of remote controller 146. This preferred feature permits either opposing display to be selected as the parental unit. Upon reading the teachings of this specification, those with ordinary skill in the art will now understand that, under appropriate circumstances, considering such issues as economics, user preference, features, etc., other programming arrangements may suffice.

Preferably, power for electronic image display system 100 is provided by a single power source 140, as shown. Preferably, power source 140 is user controllable by means of front panel 144, remote controller 146 and/or by microcontroller 196.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A method, relating to displaying at least one electronic image on back-to-back oriented electronic image display screens, comprising the steps of:
   a) providing at least two electronic image display screen modules arranged in a back-to-back orientation, having shared display-screen-module image-controller circuitry, within a single common unitary housing, such electronic image display screen modules arranged so that at least one displayed electronic image may be viewed simultaneously by at least two persons when such at least two persons are situated on opposite sides of at least one of the at least two electronic image display screens; and
   b) receiving at least one image signal, comprising the at least one electronic image, from at least one signal generator external to such single common unitary housing;
   c) wherein such shared display-screen-module image-controller circuitry permits display of the at least one electronic image on such electronic image display screen modules permitting viewing of the at least one displayed electronic image by the at least two persons.

2. The method, according to claim 1, further comprising the steps of permitting controlling, by a first person, such displayed electronic image.

3. An electronic image display system relating to displaying at least one electronic image on back-to-back oriented electronic image display screens permitting viewing of the at least one displayed electronic image by at least two persons when such at least two persons are situated on opposite sides of the at least two electronic image display screens, said electronic image display system comprising:
- a) at least two electronic image display screen modules arranged in a back-to-back orientation, having shared display-screen-module image-controller circuitry, within a single common unitary housing, said at least two electronic image display screen modules arranged so that at least one displayed electronic image may be viewed simultaneously by at least two persons when such at least two persons are situated on opposite sides of said at least two electronic image display screens; and
- b) at least one image signal receiver to receive the at least one image signal comprising the at least one electronic image from at least one signal generator external to said single common unitary housing;
- c) wherein said shared display-screen-module image-controller circuitry permits display of the at least one electronic image on said electronic image display screens modules.

4. An electronic image display system relating to displaying at east one electronic image on back-to-back oriented electronic image display screens permitting viewing of the at least one displayed electronic image by at least two persons when such at least two persons are situated on opposite sides of the at least two electronic image display screens, said electronic image display system comprising:
- a) at least two electronic display screen modules arranged in back-to-back orientation, having shared display-screen-module image-controller circuitry, within a single common unitary housing, said at least two electronic image display screen modules arranged so that at least one displayed electronic image may be viewed simultaneously by at least two persons when such at least two persons are situated on opposite sides of said at least two electronic image display screens; and
- b) at least one image signal receiver to receive the at least one image signal comprising the at least one electronic image from at least one signal generator;
- c) wherein said shared display-screen-module image-controller circuitry permits display of the at least one electronic image on said electronic image display screen modules.

* * * * *